United States Patent
Hirana

(10) Patent No.: US 9,197,499 B2
(45) Date of Patent: Nov. 24, 2015

(54) VIRTUAL SERVER MIGRATION PLAN MAKING METHOD AND SYSTEM

(71) Applicant: HITACHI, LTD., Tokyo (JP)

(72) Inventor: Ryo Hirana, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 158 days.

(21) Appl. No.: 14/103,954

(22) Filed: Dec. 12, 2013

(65) Prior Publication Data

US 2014/0207920 A1 Jul. 24, 2014

(30) Foreign Application Priority Data

Jan. 22, 2013 (JP) ................................. 2013-008895

(51) Int. Cl.
 *H04L 12/24* (2006.01)
(52) U.S. Cl.
 CPC ........ *H04L 41/0803* (2013.01); *H04L 41/0813* (2013.01)
(58) Field of Classification Search
 CPC .................. H04L 41/0803; H04L 41/0813
 See application file for complete search history.

(56) References Cited

U.S. PATENT DOCUMENTS

| 2010/0332661 | A1* | 12/2010 | Tameshige | 709/226 |
|---|---|---|---|---|
| 2012/0066684 | A1* | 3/2012 | Takami | 718/102 |
| 2013/0282887 | A1* | 10/2013 | Terayama et al. | 709/223 |
| 2013/0346584 | A1* | 12/2013 | Tameshige et al. | 709/223 |
| 2014/0143391 | A1* | 5/2014 | Tanigawa et al. | 709/221 |
| 2015/0163092 | A1* | 6/2015 | Takagi et al. | 709/223 |

FOREIGN PATENT DOCUMENTS

WO 2009/037915 A1 3/2009

* cited by examiner

*Primary Examiner* — Larry Donaghue
(74) *Attorney, Agent, or Firm* — Mattingly & Malur, PC

(57) ABSTRACT

The management software of virtual servers which collects the information on the configuration change conducted on the physical server, and simulates the state of the physical server after the configuration change is conducted. Thereafter, the simulated information is input to the compatibility check function to confirm the compatibility of the virtual server operation to the physical server changed in the configuration, and used for making the migration plan.

6 Claims, 14 Drawing Sheets

FIG.4

PHYSICAL SERVER MANAGEMENT TABLE 310

| PHYSICAL SERVER ID (400) | PHYSICAL SERVER CONFIGURATION INFORMATION (410) ||||  PHYSICAL SERVER LOAD INFORMATION (420) |||
|---|---|---|---|---|---|---|---|
| | HYPERVISOR (411) | VIRTUAL SERVER (412) | THE NUMBER OF CPU'S (413) | THE AMOUNT OF MEMORY (414) | DATE (421) | CPU LOAD (422) | MEMORY LOAD (423) |
| S1 | HV1 | VM1 VM2 | 8 | 16GB | 2010/7/1 00:00 | 80% | 100% |
| | | | | | 2010/7/1 00:01 | 70% | 90% |
| S2 | HV2 | – | 8 | 32GB | 2010/7/1 00:00 | 40% | 20% |
| | | | | | 2010/7/1 00:01 | 70% | 20% |

FIG.5

PHYSICAL SERVER SIMULATION TABLE 311

| PHYSICAL SERVER ID (500) | PHYSICAL SERVER CONFIGURATION INFORMATION (510) |||| PHYSICAL SERVER LOAD INFORMATION (520) |||
|---|---|---|---|---|---|---|---|
| | HYPERVISOR (511) | VIRTUAL SERVER (512) | THE NUMBER OF CPU'S (513) | THE AMOUNT OF MEMORY (514) | DATE (521) | CPU LOAD (522) | MEMORY LOAD (523) |
| S1 | HV1 | VM1 VM2 | 8 | 16GB | 2010/7/1 00:00 | 80% | 100% |
| | | | | | 2010/7/1 00:01 | 70% | 90% |
| S2 | HV2 | – | 8 | 32GB | 2010/7/1 00:00 | 40% | 20% |
| | | | | | 2010/7/1 00:01 | 70% | 20% |

FIG.6

CONFIGURATION CHANGE MANAGEMENT TABLE 312

| CONFIGURATION CHANGE ID | TARGET SERVER SEARCH CONDITION | SERVER SHUTDOWN PRESENCE/ ABSENCE | REQUIRED TIME | CONFIGURATION CHANGE CONTENTS |
|---|---|---|---|---|
| C1 | Cell[Column=HYPERVISOR]==HV1 | NECESSARY | 20 MINUTES | Cell[Column=HYPERVISOR]=HV2 |
| 600 | 601 | 602 | 603 | 604 |

FIG.7

VIRTUAL SERVER MANAGEMENT TABLE 313

| VIRTUAL SERVER ID | VIRTUAL SERVER CONFIGURATION INFORMATION | | | VIRTUAL SERVER LOAD INFORMATION | | | ALLOWABLE DOWNTIME |
|---|---|---|---|---|---|---|---|
| | OS | THE NUMBER OF CPU'S | THE AMOUNT OF MEMORY | DATE | CPU LOAD | MEMORY LOAD | |
| VM1 | OS1 | 4 | 8GB | 2010/7/1 00:00 | 100% | 100% | 1 SECOND |
| | | | | 2010/7/1 00:01 | 90% | 90% | |
| VM1 | OS2 | 2 | 2GB | 2010/7/1 00:00 | 20% | 40% | 10 MINUTES |
| | | | | 2010/7/1 00:01 | 10% | 10% | |
| 700 | 710 / 711 | 712 | 713 | 721 | 722 | 723 | 730 |

TASK SIMULATION TABLE

| TASK ID | TASK INFORMATION ID | TASK INPUT | TASK OUTPUT |
|---|---|---|---|
| T1 | M1 | [1] MIGRATION TARGET VIRTUAL SERVER ID<br>[2] MIGRATION SOURCE PHYSICAL SERVER ID<br>[3] MIGRATION DESTINATION PHYSICAL SERVER ID | [1] Cell [Record: PHYSICAL SERVER ID = MIGRATION SOURCE PHYSICAL SERVER ID]<br>　　[Column= VIRTUAL SERVER]<br>　-= MIGRATION TARGET VIRTUAL SERVER ID<br><br>[2] Cell [Record: PHYSICAL SERVER ID = MIGRATION DESTINATION PHYSICAL SERVER ID]<br>　　[Column=VIRTUAL SERVER]<br>　+= MIGRATION TARGET VIRTUAL SERVER ID<br>... |

MIGRATION METHOD MANAGEMENT TABLE 315

| METHOD ID | METHOD NAME | REQUIRED TIME | VIRTUAL SERVER DOWNTIME |
|---|---|---|---|
| M1 | COLD MIGRATION | 180 SECONDS | 120 SECONDS |
| M2 | LIVE MIGRATION | 60 SECONDS | 0.1 SECONDS |

VIRTUAL SERVER MIGRATION PLAN 316

| PROCEDURE | SCHEDULED START DATE | TASK | EXECUTION CONTENTS |
|---|---|---|---|
| 1 | 2000/1/1 00:00 | T1 | MIGRATE VM1 FROM S1 TO S2 BY SYSTEM M2 |
| 2 | 2000/1/1 00:01 | T1 | MIGRATE VM2 FROM S1 TO S2 BY SYSTEM M2 |
| 3 | 2000/1/1 00:02 | C1 | UPDATE HYPERVISOR OF S1 FROM HV1 TO HV2 |
| 4 | 2000/1/1 00:30 | T1 | UPDATE VM2 FROM S2 TO S1 BY SYSTEM M2 |
| 5 | 2000/1/1 00:31 | T1 | UPDATE VM1 FROM S2 TO S1 BY SYSTEM M2 |

1000   1001   1002   1003

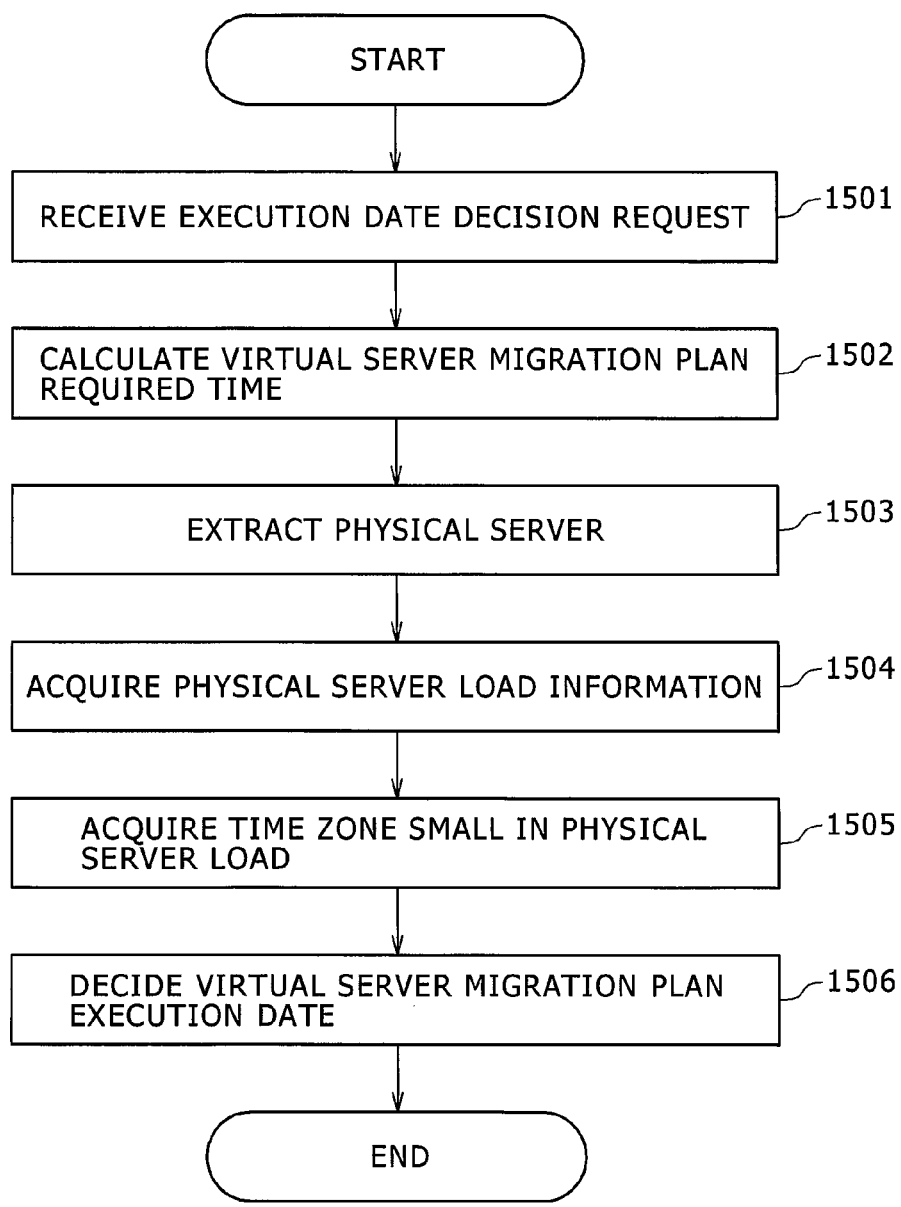

VIRTUAL SERVER MIGRATION PLAN MAKING METHOD AND SYSTEM

CROSS-REFERENCE TO RELATED APPLICATION

This application claims the priority of Japanese Patent Application No. 2013-008895 filed Jan. 22, 2013, which is incorporated herein by reference in its entirety.

BACKGROUND

The present invention relates to a management of virtual servers that operate on a physical server.

In an information system, there periodically occurs operation for changing a configuration of the physical server such as component replacement associated with version update of software or a failure of hardware, or added resources for performance enhancement. In general, when the configuration is changed, there is a need to reboot the physical server for the purpose of allowing software such as an OS or a hypervisor that operates on the physical server to correctly recognize the configuration change. For that reason, the system stops and is unavailable while the configuration change is being conducted.

In order to reduce a downtime in this situation, the physical server is virtualized, and the virtual server is migrated to another physical server by a migration function. Specifically, all of virtual servers on a first physical server are migrated to a second physical server (virtual server evacuation), the configuration changes of the first physical server and the reboot are conducted (configuration change), and the virtual servers are again migrated to the first physical server, and returned to an original state (virtual server reverse migration). If a live migration function that enables the virtual servers to be migrated with no shutdown is used during migration, the system can be changed in the configuration with no shutdown.

If the configuration change of the physical server is necessary, a system administrator makes a migration plan in advance for the purpose of conducting the configuration change of the physical server and the migration of the virtual servers associated with the configuration change without any problem. The migration plan includes physical servers which are a source and a designation of the virtual server, a time for executing the migration, the contents of the configuration change, and a required time for the configuration change.

One of important elements to be considered in the migration plan is a compatibility of the virtual server operation in the source and destination physical servers. For example, if an instruction set of a processor is different between the source physical server and the destination physical server, the virtual server cannot operate on the destination physical server, and the migration fails. In general, management software of the virtual server is installed with a compatibility check function for preventing such a situation. The compatibility check function collects the respective configuration information and load information of the source physical server and the destination physical server, and compares those information with each other to confirm that the configurations of those physical servers match each other, the operation of the virtual server is not effected by a difference in the configuration between those physical servers, or the destination physical server has resources sufficient to operate the virtual server.

The system administrator can confirm whether the virtual server can be migrated, or not, with reference to the check results of the compatibility by the management software. Then, the check results can be used to determine the destination of the virtual server, and make the migration plan.

SUMMARY

In the operation of the virtual server evacuation, the configuration change, and the virtual server reverse migration as described above, when the compatibility of the virtual server operation is lost between the first physical server and the second physical server with the configuration change of the first physical server, the virtual server fails to be returned to the first physical server. In making the migration plan, there is a need to clarify such a risk in advance.

However, the management software of the virtual server cannot know a state of the virtual server after the configuration change in advance. For that reason, the compatibility check function cannot be used to make the migration plan when the configuration change of the physical server is conducted. That is, the related art suffers from a problem that the management software cannot collect the state of the physical server after the configuration change in advance.

PCT International Publication No. WO09/037,915 estimates a change in a load of the physical server when a part of the virtual server is migrated, and makes a reallocated plan of the virtual server. However, because the compatibility of the virtual server operation is not taken into account, this technique cannot be used for make the plan when the configuration of the physical servers is different from each other.

In order to address the above problem, a virtual server migration plan making method, and a system therefor according to the present invention each include a plurality of physical servers, virtual servers that operates on the physical servers, and a management server connected to the plurality of physical servers. The management server includes a physical server management table that manages configuration information on the physical servers and load information on the physical servers for each of the physical servers, a physical server simulation table obtained by copying the physical server management table, a virtual server management table that manages configuration information on the virtual servers, load information on the virtual servers, and an allowable downtime of the virtual servers, for each of the virtual servers, a task simulation table that manages changed contents for the physical server simulation table in order to simulate a task of the virtual server migration, and a migration method management table that manages the downtime of the virtual servers for each migration method of the virtual servers. Upon receiving a request for making a virtual server migration plan associated with the configuration change of the physical server, the management server specifies a virtual server that operates on any physical server to be subjected to the configuration change, acquires the allowable downtime of the specified virtual server with reference to the virtual server management table, selects the migration method of the virtual server having a downtime shorter than the allowable downtime of the acquired virtual server with reference to the migration method management table, specifies a destination physical server to which the virtual server can be migrated with reference to the physical server management table or the physical server simulation table, applies change content for simulating a task of the virtual server migration managed by the task simulation table to the physical server simulation table, and stores information on the virtual server to be migrated, the source physical server, the destination physical server, and the migration method of the virtual server in the virtual server migration plan provided in the management software, as the change contents of the task of the simulated virtual server migration.

According to the present invention, the state of the physical server after the configuration change is simulated within the management software whereby the compatibility of the virtual server operation can be checked in advance, with no change of the current system. As a result, the migration plan of the virtual server when the configuration change of the physical server is conducted can be automatically made.

BRIEF DESCRIPTION OF THE DRAWINGS

FIG. 4 is a diagram illustrating an example of a physical server management table;

FIG. 5 is a diagram illustrating an example of a physical server simulation table;

FIG. 6 is a diagram illustrating an example of a configuration change management table;

FIG. 7 is a diagram illustrating an example of a virtual server management table;

FIG. 8 is a diagram illustrating an example of a task simulation table;

FIG. 9 is a diagram illustrating an example of a migration method management table;

FIG. 10 is a diagram illustrating an example of a virtual server migration plan;

FIG. 15 is a flowchart illustrating an example of an operating procedure of determining a virtual server migration execution date.

DETAILED DESCRIPTION

A system according to the present invention will be described with reference to the accompanying drawings. This embodiment shows a configuration and a method in which, in a system configuration where a first physical server, a second physical server, and a management server are connected to each other over a network, a plan for migrating virtual servers that operate on the first physical server when the configuration change is conducted on the first physical server is made in the management server.

Figure 1:
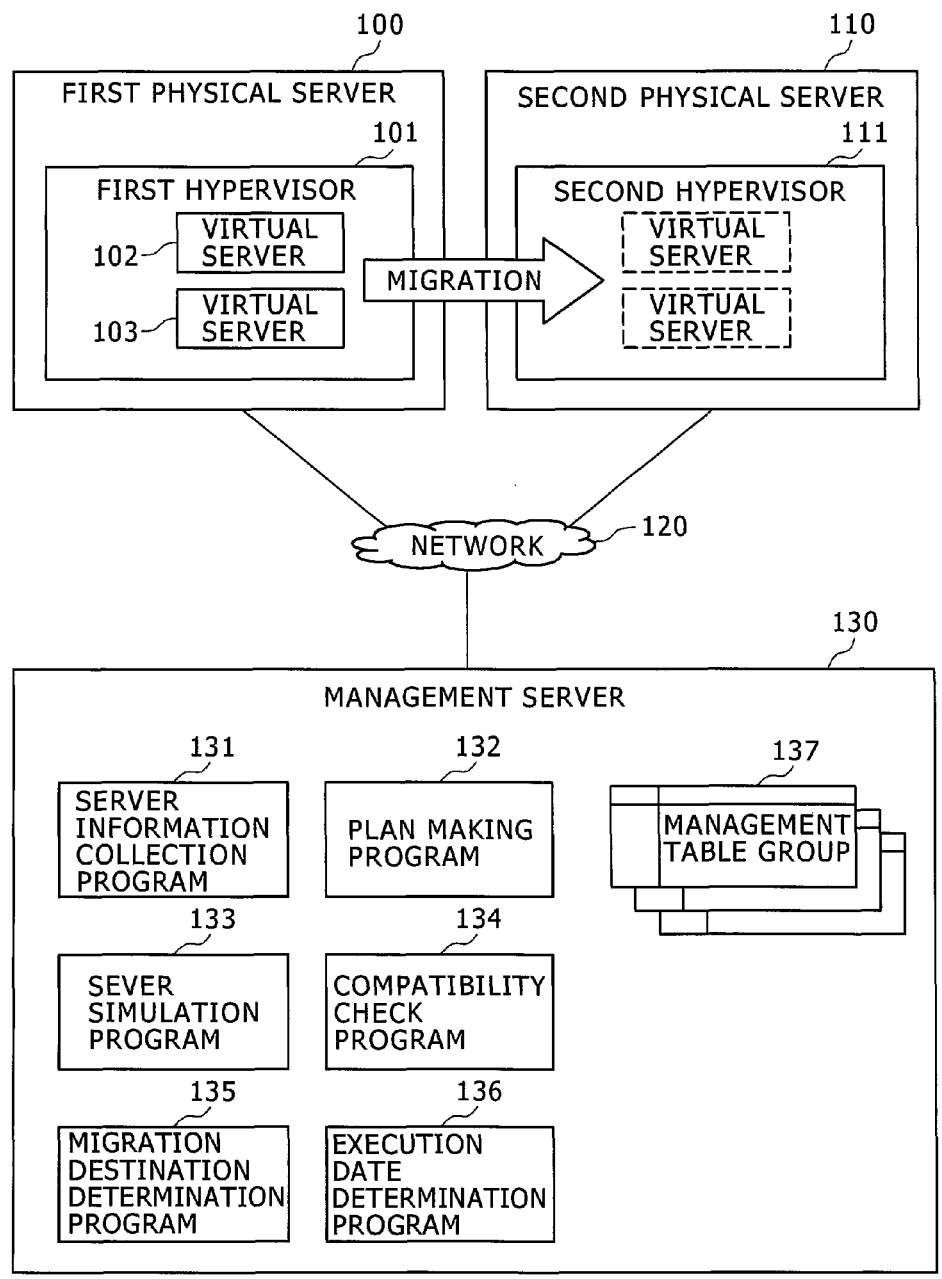
FIG. 1 is a diagram illustrating an example of a configuration of a virtual server migration plan making system.

FIG. 1 is a diagram illustrating an example of a configuration of the virtual server migration plan making system. The virtual server migration plan making system includes a first physical server 100, a second physical server 110, a network 120, and a management server 130. The first physical server 100, the second physical server 110, and the management server 130 are connected to each other over the network 120.

A first hypervisor 101 and a second hypervisor 111 operate in the first physical server 100 and the second physical server 110, respectively. Also, virtual servers 102 and 103 operate in the first hypervisor 101. In making the virtual server migration plan, a source of the virtual servers 102 and 103 is set as the first physical server 100, a destination of the virtual servers 102 and 103 is set as the second physical server 110 to make a plan for migrating the virtual servers 102 and 103. In this example, the number of each of the virtual servers 102 and 103 that operate on the first physical server 100 may be one or more. Also, one or more virtual servers may operate on the second physical server 110 as with the first physical server 100.

The management server 130 includes a server information collection program 131, a plan making program 132, a server simulation program 133, a compatibility check program 134, a destination determination program 135, an execution date determination program 136, and a management table group 137. The respective details will be described with reference to FIG. 3 later.

Figure 2:
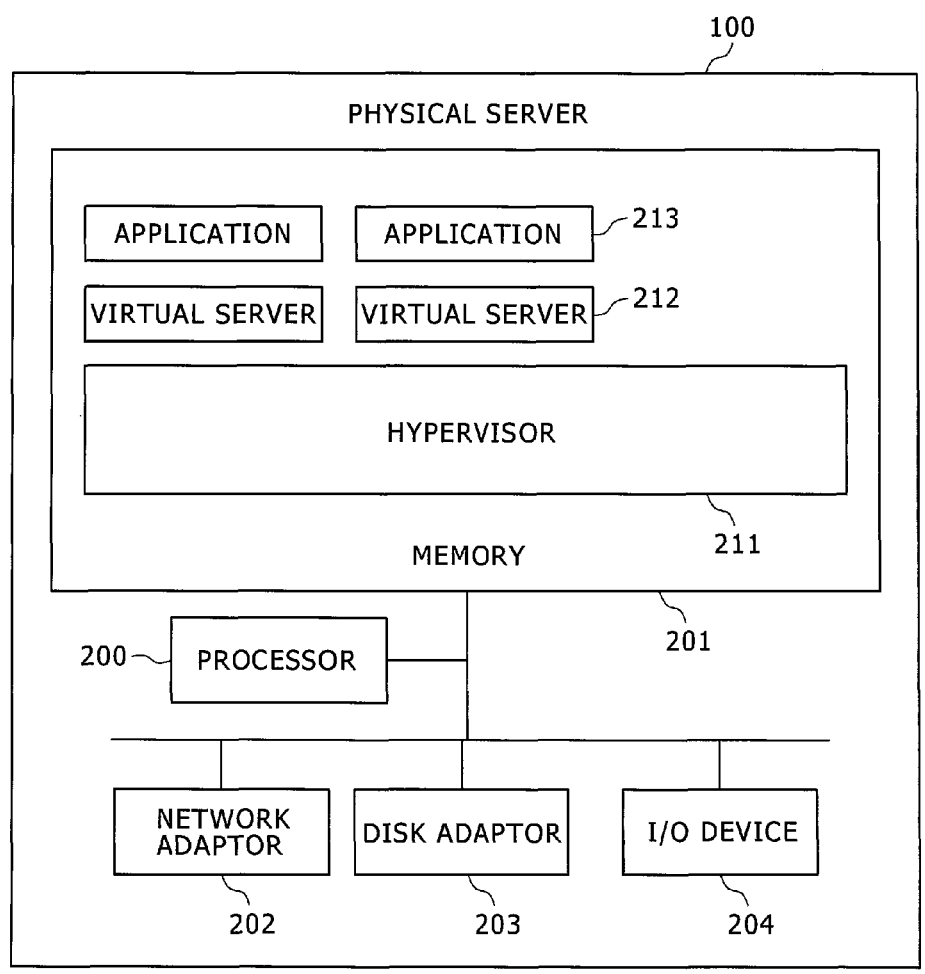
FIG. 2 is a diagram illustrating an example of a detailed configuration of a physical server.

FIG. 2 is a diagram illustrating an example of a configuration of the physical server. The physical server corresponds to the first physical server 100 and the second physical server 110 in FIG. 1.

The physical server 100 includes a processor 200, a memory 201, a network adaptor 202 that is connected to the network such as the network 120, a disk adaptor 203 connected to the recording medium such as a hard disk, and an input/output device 204 such as a keyboard or a display, which is a physical server having a general configuration in which the respective components are connected to each other. A plurality of the network adaptors 202 may be provided, and the network adaptor 202 may be connected to a network other than the management server 130. Also, a plurality of the processors 200, a plurality of the disk adaptors 203, and a plurality of the input/output devices 204 may be provided.

The processor 200 reads programs of a hypervisor 211, a virtual server 212, and an application 213 from a recoding medium connected to the disk adaptor 203 in the memory 201 in advance, and executes the programs described in the hypervisor 211, the virtual server 212, and the application 213.

The hypervisor 211 is a program having a function of managing physical resources such as the processor 200 or the memory 201 provided in the physical server 100, and allocating a physical resource logically divided to the virtual server 212. With this function, the virtual server 212 can operate on the physical server 100.

The virtual server 212 executes the application 213 with the use of the resource allocated from the hypervisor 211. In this example, the application 213 that is executed on the virtual server is an arbitrary program provided by the information system or general operating system such as Linux (registered trademark) or Windows (registered trademark).

Figure 3:
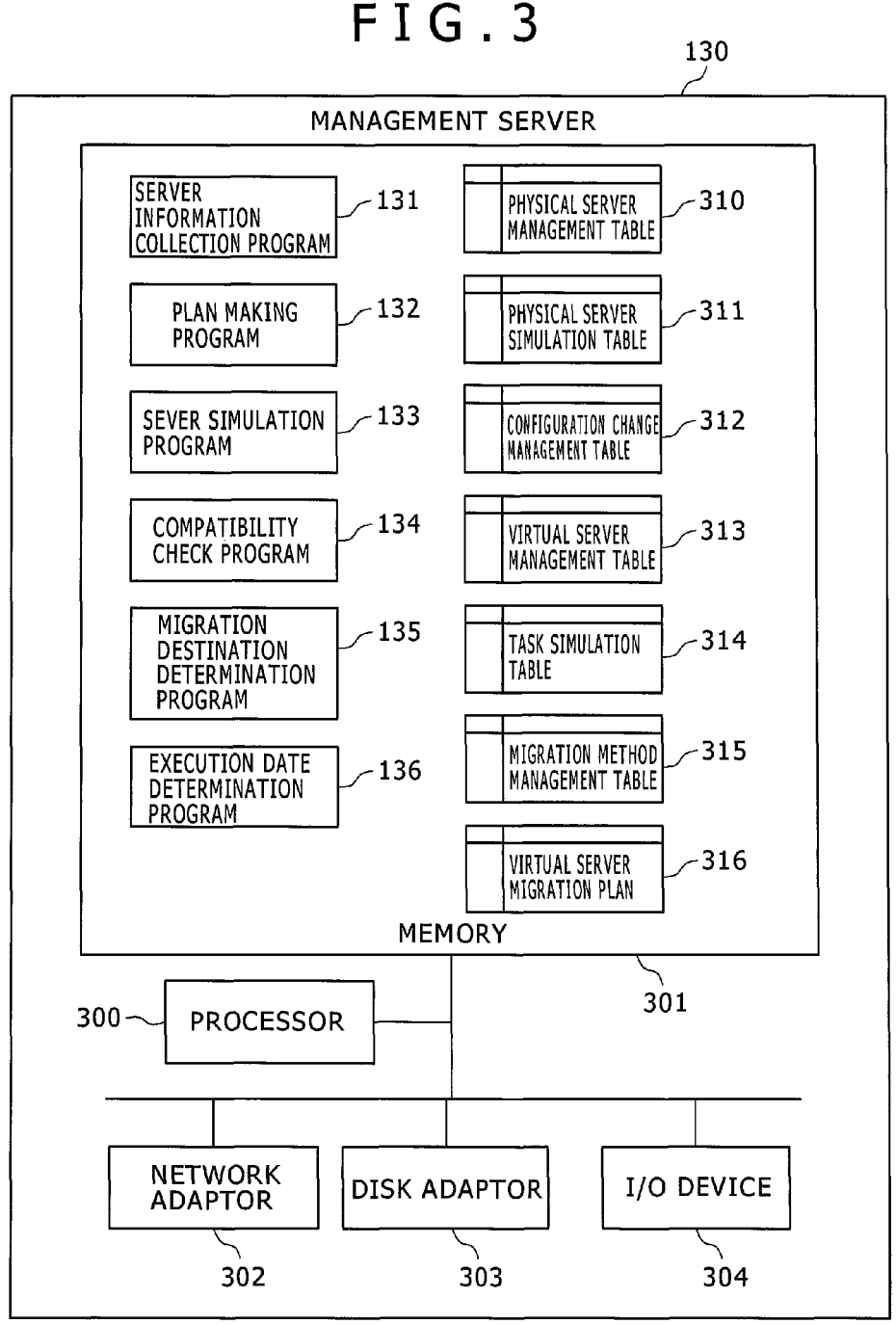
FIG. 3 is a diagram illustrating an example of a detailed configuration of a management server.

FIG. 3 is a diagram illustrating an example of a detailed configuration of the management server 130. The management server 130 has the same configuration as that of the physical server 100, and stores the server information collection program 131, the plan making program 132, the server simulation program 133, the compatibility check program 134, the destination determination program 135, the execution date determination program 136, a physical server management table 310, a physical server simulation table 311, a configuration change management table 312, a virtual server management table 313, a task simulation table 314, a migration method management table 315, and a virtual server migration plan 316 in a memory 301. Those programs and tables are read from the recording medium and stored in the memory 301 by a processor 300. Hereinafter, the processing executed with the respective programs as subjects will be described. In fact, the processor 300 reads the respective programs from the memory 301, and executes the respective programs.

The server information collection program 131 connects to the first physical server 100 and the second physical server 110 through the network 120, collects configuration information and load information on the first hypervisor 101, the second hypervisor 111, the virtual servers 102, 103, and stores those information in the physical server management table 310 and the virtual server management table 313. The server information collection program 131 periodically executes the collection of the information, and continuously updates the information stored in the physical server management table 310 and the virtual server management table 313 to updated values. In this example, the configuration information is, for example, the type and version of the hypervisors 101 and 111, the amount of resources provided in the physical servers 100 and 110, or the amount of resources allocated to the virtual servers 102 and 103 by the hypervisors 101 and 111. Also, the load information is, for example, values that associate the amount of resources actually consumed by the virtual servers 102 and 103 at a certain time with times.

The plan making program 132 receives information on the configuration change to be conducted on the physical server 100, instructs the server simulation program 133, the compatibility check program 134, the destination determination program 135, and the execution date determination program 136 to start the virtual server migration plan making, and makes the virtual server migration plan 316.

The server simulation program 133 copies the contents of the physical server management table 310, and creates the physical server simulation table 311. The server simulation program 133 updates the contents of the physical server simulation table 311 on the basis of the information stored in the configuration change management table 312, and simulates the configuration change to be conducted on the physical server 100. Also, the server simulation program 133 updates the contents of the physical server simulation table 311 on the basis of the information stored in the task simulation table 314, and simulates a task such as migrating the virtual servers 102 and 103 from the first physical server 100 to the second physical server 110.

The compatibility check program 134 is a program that checks whether there occurs any problem when the virtual servers 102 and 103 migrate from the source first physical server 100 to the destination second physical server 110, or not, in advance, which is a general program provided in management software of the first hypervisor 101 and the second hypervisor 111. The compatibility check program 134 acquires the configuration information on the first physical server 100 and the configuration information on the second physical server 110 with reference to the physical server management table 310 and the virtual server management table 313, compares with respective configuration information with each other, checks whether the configurations mismatch each other, or not, and whether the virtual servers 102 and 103 can be migrated without any problem even if mismatching occurs, and outputs check results.

The destination determination program 135 is a program that finds the physical server that can migrate a designated arbitrary virtual server, which is a general program provided by the management software of the first hypervisor 101 and the second hypervisor 111. The destination determination program 135 acquires the configuration information on all of the physical servers with reference to the physical server management table 310, confirms whether the virtual servers designated for the respective physical servers can be migrated, or not, with the use of the compatibility check program 134, and outputs confirmation results. In this situation, if there is a plurality of physical servers found to be migratable by the compatibility check program 134, the load information stored in the physical server management table 310 is acquired, and the migratable physical server with a priority smaller in the load may be output.

The execution date determination program 136 determines a time when the virtual servers 102 and 103 that operate on the first physical server 100 migrate to the second physical server 110. The execution date determination program 136 acquires the loads of the virtual servers 102 and 103 at each time, and the load of the second physical server 110 at each time, with reference to the physical server management table 310 and the virtual server management table 313. Then, execution date determination program 136 superposes the loads of the virtual servers 102 and 103 on the load of the second physical server 110 to simulate the migration. Thereafter, the execution date determination program 136 calculates a time when the loads superposed on each other do not exceed the amount of resource provided in the second physical server 110, and outputs the calculated time as a migratable time.

The configuration of the management server 130 is not limited to the configuration illustrated in FIG. 3, but may operate on the virtual server 212 virtualized by the hypervisor 211 as illustrated in FIG. 2. In this case, the respective programs of the management server 130 correspond to the application 213 that operates on the virtual server 212.

FIG. 4 is a diagram illustrating an example of the physical server management table 310. A format of the physical server management table 310 illustrated in FIG. 4 is exemplary, and the present invention is not limited to the format illustrated in FIG. 4.

The physical server management table 310 is a table that holds information collected by the server information collection program 131 for the physical servers 100 and 110 existing in the system. The physical server management table 310 stores a physical server ID 400 that is an identifier (hereinafter referred to as "ID") which uniquely identifies the physical server, configuration information 410 of the physical server, and load information 420 on the physical server therein.

The configuration information column 410 includes a sub-column, and stores the amount of resource provided in the physical server, and software information that operates on the physical server therein. The sub-column stores a hypervisor 411 representing the type and version of the hypervisor of the physical server, a virtual server ID 412 representing the virtual server that operates on the physical server, the number of CPUs 413 representing the number of processors 200 provided in the physical server, and the number of memory 414 representing the amount of memory 201 provided in the physical server therein. Other configuration information such as an IP address or a disk capacity of the physical server may be stored in the sub-column.

The physical server load information column 420 includes a sub-column, and stores the amount of resource consumed by the software that operates on the physical server at a certain time in association with the time. The sub-column stores a CPU load 422 representing the amount of CPU consumed by the software, a memory load 423 representing the amount of memory used by the software, and a date 421 at which the CPU load 422 or the memory load 423 are measured therein. The physical server load information column 420 stores the combination of the date 421 with the combination of the load information on the CPU load 422 or the memory load 423 at the date 421, at each time. With this configuration, a system administrator refers to the resource consumed by the software at a past arbitrary time. Other load information such as a network I/O load or a disk I/O load at the date 421 may be stored in the physical server load information column 420.

FIG. 5 is a diagram illustrating an example of the physical server simulation table 311. A format of the physical server simulation table 311 illustrated in FIG. 5 is exemplary, and the present invention is not limited to the format illustrated in FIG. 5.

The physical server simulation table 311 is a table used for simulating the configuration change or the virtual server migration to be conducted on the physical servers 100 and 110 existing in the system. The physical server simulation table 311 includes the same column as that of the physical server management table 310, and stores a physical server ID 500, physical server configuration information 510, and physical server load information 520 therein. Also, the physical server configuration information 510 and the physical server load information 520 include the sub-column as with the physical server management table 310.

The physical server simulation table 311 is created by copying the physical server management table 310 through the server simulation program 133. Therefore, the physical server simulation table 311 stores the configuration information and the load information on the physical servers 100 and 110 at a time when the physical server management table 310 is copied by the server simulation program 133 therein. The physical server management table 310 is continuously updated by the server information collection program 131, but the physical server simulation table 311 is updated by only the server simulation program 133. The value stored in the physical server simulation table 311 is altered so that an appearance of the configuration change conducted on the physical servers 100 and 110 can be reproduced and simulated. In this situation, because the value stored in the physical server management table 310 is not altered at all, the physical server management table 310 continues to keep updated information of the physical servers 100 and 110 without being affected by the simulation.

The same simulation table may be created by copying the management table through the server simulation program 133 as occasion demands. For example, when there is a need to copy the virtual servers 102 and 103 existing in the system, the virtual server management table 313 can be copied to create the virtual server simulation table.

FIG. 6 is a diagram illustrating an example of the configuration change management table 312. A format of the configuration change management table 312 illustrated in FIG. 6 is exemplary, and the present invention is not limited to the format illustrated in FIG. 6.

The configuration change management table 312 is a table that stores the contents of the configuration change received by the plan making program 132 therein. The configuration change management table 312 stores a configuration change ID 600 that uniquely identifies the configuration change contents, a target server search condition 601 that describes a condition under which the physical server to be subjected to the configuration change is searched from the physical server management table 310, a server shutdown presence/absence 602 representing whether the shutdown of the physical server is necessary when the configuration change is conducted, or not, a required time 603 of the configuration change, and configuration change contents 604 therein.

For example, when the versions of the hypervisor 101 and 110 that operate on the physical servers 100 and 110 are upgraded from HV1 to HV2, a condition expression such as Cell[Column=hypervisor]==HV1 is stored in the target server search condition column 601. The condition expression is combined with a name of a hypervisor column 411 which is a column to be searched within the physical server management table 310, and a condition expression confirming whether a value stored in the column is HV1, or not. In this case, the condition expression stored in the target server search condition column 601 may be described with the use of an equality operator (==) representing the matching of the values as well as an arbitrary comparative operator such as a greater-than sign (>) or a lesser-than sign (<) representing the magnitude of the values. In addition, a plurality of search conditions stored in the target server search condition column 601 may be present, and a condition under which those conditions are combined together with the use of OR or AND may be described.

Also, when the versions of the hypervisors 101 and 110 that operate on the physical servers 100 and 110 are upgraded from HV1 to HV2, an calculation expression such as Cell [Column=hypervisor]=HV2 is stored in the configuration change contents column 604 to describe the configuration change conducted to the physical servers. The calculation expression is combined with a name of the hypervisor column 411 which is a column where the value is changed within the physical server management table 310 associated with the configuration change, and an expression representing that HV2 is stored to the column. In this case, the calculation expression described in the configuration change contents column 604 may be described with the use of an assignment operator (=) representing the addition (+=) or the subtraction (−=) of the values. In addition, a plurality of calculation expressions described in the configuration change contents 604 may be present, and those calculation expressions may be applied to different cells within the physical server management table 310, separately.

FIG. 7 is a diagram illustrating an example of the virtual server management table 313. A format of the virtual server management table 313 illustrated in FIG. 7 is exemplary, and the present invention is not limited to the format illustrated in FIG. 7.

The virtual server management table 313 is a table that holds information collected by the server information collection program 131 in the virtual servers 102 and 103 existing in the system. The virtual server management table 313 has the same column as that of the physical server management table 310, and stores an ID 700 that uniquely identifies the virtual server, virtual server configuration information 710, and virtual server load information 720 therein. Also, the virtual server management table 313 stores an allowable downtime 730 that represents a downtime that can be allowed when the virtual servers 102 and 103 are shut down due to maintenance or failure therein. The virtual server configuration information 710 and the virtual server load information 720 have sub-columns 711 to 723 as in the physical server management table 310.

FIG. 8 is a diagram illustrating an example of the task simulation table 314. A format of the task simulation table 314 illustrated in FIG. 8 is exemplary, and the present invention is not limited to the format illustrated in FIG. 8.

The task simulation table 314 is a table used for simulating a task such as a virtual server migration when the physical servers 100 and 110 existing in the system are simulated by the physical server simulation table 311. The task simulation table 314 describes the contents of a configuration change to be conducted on the physical server simulation table 311 when simulating the task. The task simulation table 314 includes an ID 800 that uniquely identifies tasks intended for the physical servers 100, 110 and the virtual servers 102, 103, a task information ID 801 for indicating records in which detailed information on the simulated task is stored, a task input 802 representing the physical server which is a target of the task, and a task output 803 representing the change contents to be conducted on the physical server simulation table 311 in order to simulate the task therein.

As an example, in a task for migrating one arbitrary virtual server from the physical server on which the virtual server operates to a different physical server, a system ID for specifying a method in migrating is stored in the task information ID column 801. The ID of the migration method will be described later.

Also, the task simulation table 314 describes in the task input column 802 that three data of an ID of the virtual server to be migrated, an ID of the source physical server, and an ID of the destination physical server are necessary as an input for specifying targets of the virtual server migration task.

Also, the task simulation table 314 describes, in the task output column 803, the combination of a cell in which the value is changed within the physical server simulation table 311 in association with the execution of the virtual server migration task, and a calculation expression representing the value stored in the cell by using the data of the task input. In the case of the virtual server migration task, when the virtual server is migrated from the source physical server to the destination physical server, in a virtual server column 512 of the physical server simulation table 311, the ID of the virtual server is removed from the cell of the record representing the source physical server, and the ID of the virtual server is added to the cell of the record representing the destination physical server.

In order to express the above change, a calculation expressions such as Cell[Record: physical server ID=migration source physical server ID][Column: virtual server]-=migration target virtual server ID, and Cell[Record: physical server ID=migration destination physical server ID][Column: virtual server]+=migration target virtual server ID are stored in the task output column 803. A character string such as the migration target virtual server ID written in the calculation expression corresponds to the task input.

In this situation, the calculation expression described in the task output column 803 may be described with the use of an arbitrary operator as with the configuration change contents column 604 of the configuration change management table 312. In addition, a plurality of calculation expressions described in the task output column 803 may be present, and those calculation expressions may be applied to the different cells within the physical server simulation table 311, separately.

When the virtual server migration task is simulated, the calculation expression to be stored in the task output column 803 is not limited to the calculation expression illustrated in FIG. 8. With the migration of the virtual server, a CPU load 522 and a memory load 523 of the source physical server are decreased by a CPU load 722 and a memory load 723 of the virtual server, and a CPU load 522 and the memory load 523 of the destination physical server are increased. In this situation, the CPU load 722 and the memory load 723 of the virtual server are converted into the CPU load 522 and the memory load 523 of the physical server with the use of the number of CPUs 513 and the amount of memory 514 of the physical server, and the number of CPUs 712 and the amount of memory 713 of the virtual server, and subtracted from the source physical server, or added to the destination physical server.

Also, when other information is stored in the sub-columns of the configuration information 410 and the physical server load information 420 of the physical server management table 310, the calculation expression corresponding to that information is stored in the task output column 803. In this situation, the task stored in the task simulation table 314 is not limited to the migration of the virtual server, but may be registered in new creation, deletion, copying, or the configuration change of the virtual server.

FIG. 9 is a diagram illustrating an example of the migration method management table 315. A format of the migration method management table 315 illustrated in FIG. 9 is exemplary, and the present invention is not limited to the format illustrated in FIG. 9.

The migration method management table 315 is a table that manages plural types of virtual server migration methods provided in the management software of the hypervisors 101 and 110. The migration method management table 315 stores a method ID 900 that uniquely identifies the virtual server migration method, a method name 901, a required time 902 required from a virtual server migration start to a migration completion when that method is used, and a downtime 903 of the virtual server when that method is used therein.

As the migration method of the virtual server, there is a cold migration that migrates the virtual server after shutdown, or a live migration that migrates the virtual server in an operating state. In general, in case of using the cold migration, the time of executing migration and the downtime of the virtual server become larger than the live migration because the cold migration is associated with the virtual server shutdown on the source physical server and the virtual server booting on the destination physical server, both of the required. On the other hand, the live migration tends to be limited to the configuration of the migratable virtual server as compared with the cold migration. When the virtual server is migrated, the method to be used is selected from the viewpoints of the required time of migration, the downtime of the virtual server, and the limit of the configuration.

FIG. 10 is a diagram illustrating an example of the virtual server migration plan 316. A format of the virtual server migration plan 316 illustrated in FIG. 10 is exemplary, and the present invention is not limited to the format illustrated in FIG. 10.

The virtual server migration plan 316 is a migration plan made by the plan making program 132, which is a final output of the present invention. The virtual server migration plan 316 stores a procedure 1000 for conducting tasks such as the virtual server migration or the physical server configuration change, a scheduled date 1001 at which the respective tasks start, a task name 1002, and task execution contents 1003 therein. The system administrator can conduct the configuration change of the physical server and the virtual server migration with reference to the virtual server migration plan 316 made by the plan making program 132 in production system.

Subsequently, in this embodiment, the procedure of making the virtual server migration plan 316 will be described in an example where the first hypervisor 101 is updated from HV1 to HV2 under the circumstances where the first physical server 100, the second physical server 110, and the management server 130 are connected to each other over the network 120, and the virtual servers 102 and 103 operate on the first physical server 100, as illustrated in FIG. 1. In updating the first hypervisor 101, when rebooting the first physical server 100 is necessary, the following migration plan will be made. First, the virtual servers 102 and 103 are migrated to the second physical server 110 from the first physical server 100 (evacuation). Second, the task of updating the first hypervisor 101 on the first physical server 100 is conducted (configuration change). Third, the virtual servers 102 and 103 are migrated from the second physical server 110 to the first physical server 100 (reverse migration). Hereinafter, a procedure of making the virtual server migration plan 316 in this situation will be described with reference to a flowchart.

Figure 11A:
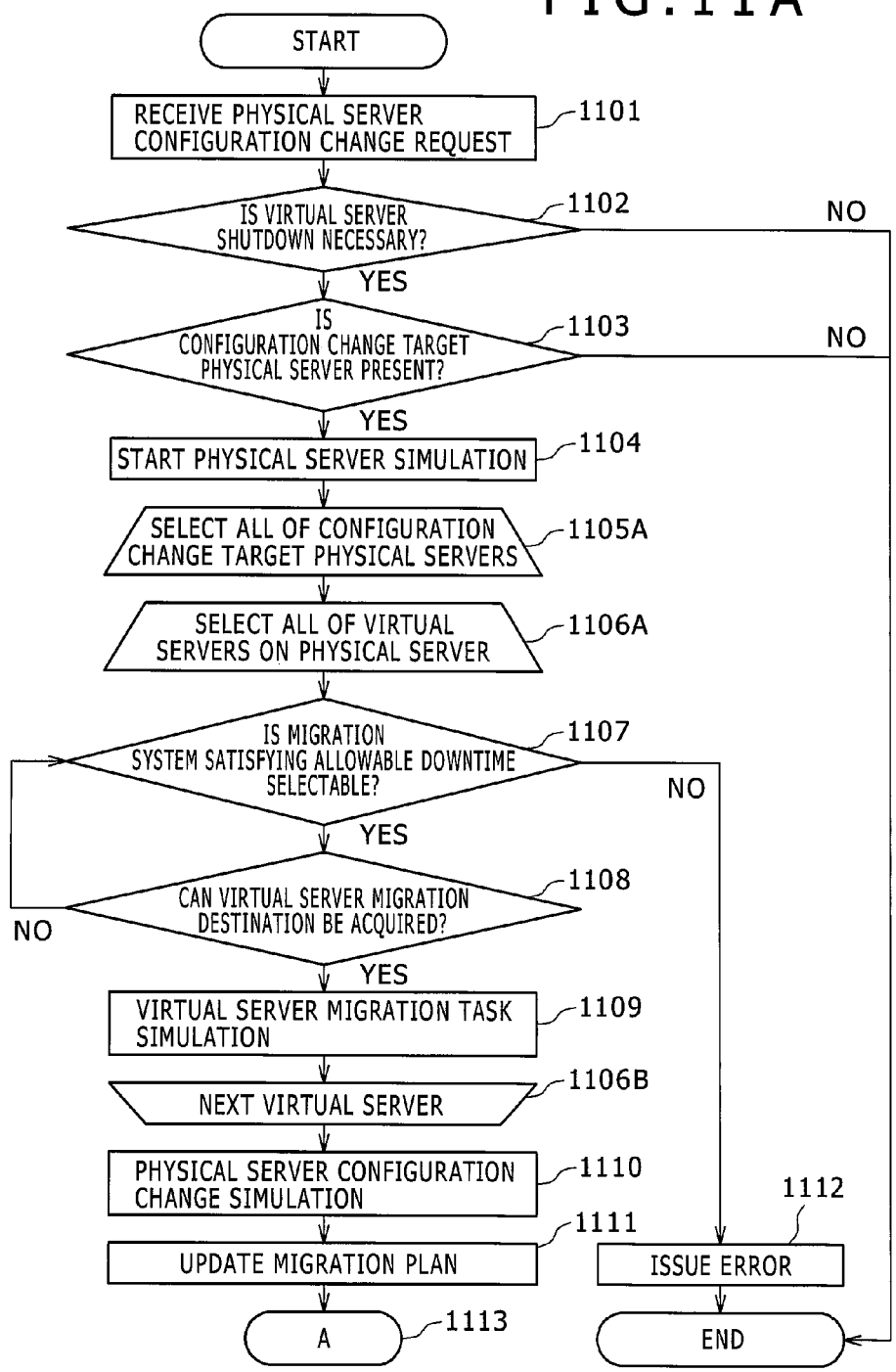
FIG. 11A is a flowchart (evacuation to update) illustrating an example of an operating procedure of making the virtual server migration plan.
Figure 11B:
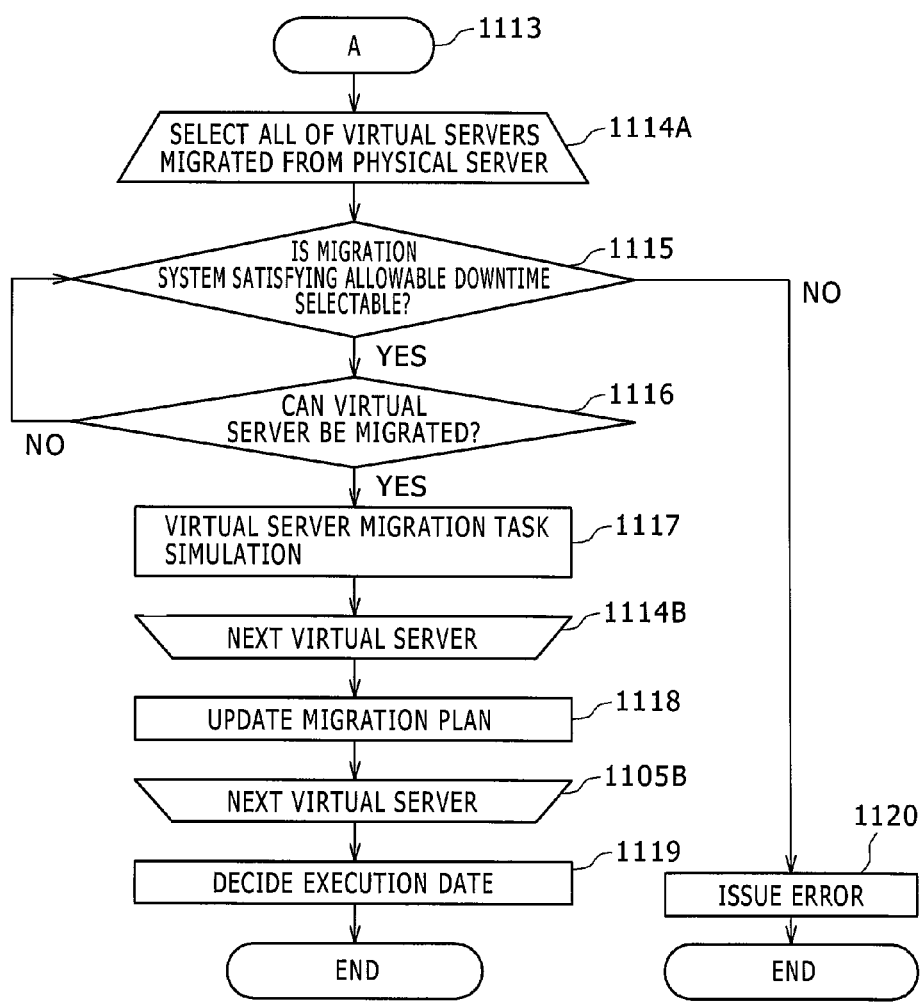
FIG. 11B is a flowchart (reverse migration, subsequent to FIG. 11C) illustrating an example of an operating procedure of making the virtual server migration plan.

FIGS. 11A and 11B are flowcharts illustrating an example of the procedure of processing of making the virtual server migration plan. In FIG. 11A, processing of evaluating the virtual servers 102 and 103 from the first physical server 100, and conducting the configuration change of the first physical server 100 will be described. In FIG. 11B, processing of reverse migrating the virtual servers 102 and 103 to the first physical server 100 subsequent to the processing illustrated in FIG. 11A will be described.

This processing is executed when the system administrator transmits a request of making the virtual server migration plan when the configuration change is conducted on the physical server 100, to the plan making program 132 of the management server 130 as a trigger. In this situation, the request includes a condition for searching the physical server to be subjected to the configuration change, the presence or absence of the shutdown of the physical server when the configuration is changed, a required time for the configuration change, and the contents of the configuration change. The trigger for executing this processing is not limited to a request from the system administrator, but may be the request from an arbitrary program. For example, the trigger is an update request such as version upgrade transmitted from developer of the physical servers 100, 110, the hypervisors 101 and 111, the components 200, 201, 202, 203, and 204 provided in the physical servers 100 and 101, the application 213 that operates on the virtual servers 102 and 103.

In step 1101, the plan making program 132 of the management server 130 receives a virtual server migration plan making request, a condition for searching the physical server to be subjected to the configuration change, the presence or absence of the shutdown of the physical server when the configuration is changed, the required time for the configuration change operation, and the contents of the configuration change. Subsequently, the plan making program 132 inserts one record into the configuration change management table 312, and stores the above condition in the target server search condition column 601, the presence or absence of the shutdown of the physical server in the server shutdown presence/absence column 602, the required time in the required time column 603, and the contents of the configuration change in the configuration change contents column 604, respectively. Also, the plan making program 132 generates an identifier for uniquely identifying the record, and stores the identifier into the configuration change ID column 600.

In step 1102, the plan making program 132 acquires the value stored in the cell of the server shutdown presence/absence column 602 of the record inserted in step 1101 with reference to the configuration change management table 312. If the above value is absent, because the virtual servers 102 and 103 can continue to operate during the configuration change of the physical server 100, and does not need to make the virtual server migration plan, this processing is completed. Otherwise, the plan making program 132 executes subsequent step 1103.

In step 1103, the plan making program 132 acquires the value stored in the cell of the target server search condition column 601 of the record inserted in step 1101 with reference to the configuration change management table 312. Subsequently, the plan making program 132 searches the physical server management table 310, extracts all of the records that satisfies a server search condition included in the above cell, and acquires the IDs of the physical servers from the physical server ID column 500 of the respective records. As a result, the plan making program 132 extracts all of the physical servers to be subjected to the configuration change. In this case, a plurality of the physical server IDs may be acquired. Also, when the physical server ID is not acquired, because the physical server to be subjected to the configuration change is not present, this processing is completed.

In the examples of FIGS. 5 and 6, it is assumed, that the record in which the configuration change ID 600 of the configuration change management table 312 is C1 is inserted in step 1101. In this situation, the target server search condition 601 is Cell[Column=hypervisor]==HV1, which is intended for the physical server in which a value stored in the cell of a hypervisor column 511 of the physical server management table 310 is equals to HV1. The plan making program 132 searches the hypervisor column 511, and acquires IDs of the physical servers from the physical server ID column 500 of the record in which the value stored in the cell is HV1. In this example, the ID is S1.

In step 1104, the plan making program 132 transmits a request for starting the physical server simulation to the server simulation program 133. Upon receiving the above request, the server simulation program 133 copies the physical server management table 310 to create the physical server simulation table 311, and starts the simulation of the physical server. Detailed processing in this situation will be described later with reference to FIG. 12.

In step 1105A, the plan making program 132 selects one of the physical server IDs extracted in step 1102. Hereinafter, the plan making program 132 repetitively implements the processing from step 1106A to step 1118 while selecting one or more physical server IDs acquired in step 1102 one by one.

In step 1105B, the plan making program 132 selects one physical server ID that has not yet been selected from the physical server IDs acquired in step 1102, and subsequently implements step 1106A and subsequent steps. If the plan making program 132 has selected all of the physical server IDs, the plan making program 132 then implements step 1119.

In step 1106A, the plan making program 132 searches the physical server ID selected in a previous step from the physical server ID column 500 with reference to the physical server simulation table 311, and obtains its record. Thereafter, the plan making program 132 acquires the virtual server ID stored in the cell of a virtual server column 512 of the acquired record. As a result, all of the virtual server IDs that operate on the selected physical server are obtained.

Hereinafter, the plan making program 132 repetitively implements the processing from step 1107 to step 1109 while selecting the virtual server IDs acquired in this step one by one. If the plan making program 132 does not acquire the virtual server ID, because the virtual server that operates on the selected physical server is not present, the plan making program 132 implements step 1110 without conducting the processing from step 1107 to step 1109. In step 1106B, the plan making program 132 selects one of the virtual server IDs that has not yet been selected from the virtual server IDs acquired in this step, and implements processing subsequent to step 1107. If the plan making program 132 has selected all of the virtual server IDs, the plan making program 132 then implements step 1110.

In this example, VM1 and VM2 are obtained as the IDs of the virtual servers from a virtual server column 512 of the record in which the physical server ID is S1. Therefore, the processing from step 1107 to step 1109 is repeated twice for each of the VM1 and VM2.

In step 1107, the plan making program 132 searches the virtual server ID selected in step 1106 from the virtual server ID column 700 with reference to the virtual server management table 313, and obtains its record. Thereafter, the plan making program 132 acquires a virtual server allowable downtime stored in the cell of the allowable downtime column 730 of the acquired record. Subsequently, the plan making program 132 searches the virtual server downtime column 903 of the migration method management table 315, and extracts a record in which the virtual server downtime stored in the cell is smaller than the virtual server allowable downtime.

If the plan making program 132 extracts one or more records, the plan making program 132 selects the record having the smallest virtual server downtime stored in the cell with reference to the virtual server downtime column 903 of the respective records, and extracts the method ID from the method ID column 900 of the selected record.

Also, if the record could not be extracted, because there is no method of implementing the configuration change of the physical server while satisfying the allowable downtime of the virtual server, the plan making program 132 implements step 1112, and outputs an error to complete the processing.

In this example, a value of the allowable downtime column 730 of the virtual server management table 313 is 1 second in the case of VM1, and 10 minutes in the case of VM2. When the plan making program 132 searches the virtual server downtime column 903 of the migration method management table 315 on the basis of the respective values, it is found that the live migration of M2 satisfies the condition in the case of VM1, and the cold migration of M1 and the live migration of M2 satisfy the condition in the case of VM2. Because the virtual server downtime 903 in the live migration of M2 is smaller in the case of VM2, the plan making program 132 selects M2 as the method ID, and proceeds to step 1108.

In step 1108, the plan making program 132 transmits a destination determination request, the virtual server ID selected in step 1106, and the physical server simulation table 311 to the destination determination program 135. As described above, the destination determination program 135 is a program that outputs the physical server that can migrate on the designated virtual server with reference to the contents of the physical server management table 310. In step 1108, the destination determination program 135 returns the physical server ID that can migrate the virtual server having the above virtual server ID to the plan making program 132 with reference to the physical server simulation table 311 instead of the physical server management table 310

If one or more the migratable physical server IDs are obtained, the plan making program 132 selects one of the physical server IDs, and implements step 1109. In this situation, a method of selecting the physical server ID may arbitrarily select one physical server ID by the system administrator, or may select the physical server ID on the basis of a priority output by the destination determination program 135.

If the migratable physical server ID could not be obtained, the processing returns to step 1107, and the plan making program 132 selects a different migration method, and thereafter again executes step 1108. In this situation, if there is no migration method that satisfies the allowable downtime of the virtual server selected in step 1106, the plan making program 132 implements step 1112, and outputs an error to complete the processing.

In this example, it is assumed that a physical server S2 is obtained as a destination of the virtual servers V1 and VM2.

In step 1109, the plan making program 132 transmits a request for simulating the virtual server migration, and an ID of the virtual server migration task stored in the task ID column 800 of the task simulation table 314 to the server simulation program 133. Also, as an input value of the virtual server migration task, the plan making program 132 transmits an ID of the virtual server selected in step 1106 as the virtual server to be migrated, an ID of the physical server selected in step 1105 as the source physical server, and an ID of the physical server obtained in step 1108 as the destination physical server, respectively. Upon receiving the above requests and the above inputs, the server simulation program 133 starts the simulation of the virtual server migration task with reference to the task simulation table 314. Detailed processing in this situation will be described with reference to FIG. 13 later.

In step 1106B, the plan making program 132 selects the virtual server ID that has not yet been selected from the virtual server IDs extracted in step 1106A, and again implements the processing after step 1107. In this situation, because the physical server simulation table 311 is updated in step 1109, the destination determination in step 1108 is implemented in a state where the physical server simulation table 311 is updated, that is, in a state where the migration of the virtual server is simulated.

In step 1110, the plan making program 132 transmits a request for simulating the physical server configuration change, and the configuration change ID stored in the configuration change ID column 600 of the record inserted in the configuration change management table 312 in step 1101, to the server simulation program 133. Upon receiving the requests and the inputs, the server simulation program 133 starts the simulation of the physical server configuration change with reference to the configuration change management table 312. The processing in this situation conforms to the simulation of the virtual server migration, and will be described with reference to FIG. 14 later.

In step 1111, the plan making program 132 inserts the records of the number equal to the number of times of implementing the simulation in steps 1109 and 1110 into the virtual server migration plan 316, and stores the values in the procedure column 1000, the task column 1002, and the task execution contents column 1003 in order of implementing the simulation. In this situation, the start scheduled date column 1001 is kept blank. When the virtual server migration is conducted as the simulation, the task ID of the virtual server migration task stored in the task ID column 800 of the task simulation table 314 is stored in the task column 1002, and the ID of the virtual server to be migrated, the ID of the source physical server, the ID of the destination physical server, and the ID of the migration method are stored in the execution contents column 1003. When the physical server configuration change is conducted as the simulation, the configuration change ID stored in the configuration change ID column 600 column of the configuration change management table 312 is stored in the task column 1002, and the information stored in the configuration change contents column 604 of the configuration change management table 312 is stored in the execution contents column 1003. In both of those cases, serial numbers starting from 1 are stored in the procedure column 1000.

As an example, a migration plan in which the virtual servers VM1 and MV2 on the physical server S1 are migrated to the physical server S2, and thereafter the hypervisor of the physical server S1 is updated from HV1 to HV2 corresponds to procedures 1 to 3 in FIG. 10.

In step 1112, the plan making program 132 outputs an error indicating that there is no method of implementing the configuration change of the physical server while satisfying the allowable downtime of the virtual server, and completes this processing. The contents of the error include the ID of the target virtual server, and the contents of the physical server simulation table 311 at the time of implementing step 1112. In this situation, an output destination of the error may be an arbitrary output destination such as a log file within the management server 130, and a message screen display for the system administrator.

Step 1113 is implemented after the virtual server migration plan 316 has been updated in step 1111. The details of the processing after this step will be described with reference to FIG. 11B.

In step 1114A, the plan making program 132 acquires all of the virtual server IDs acquired in step 1106. The virtual server IDs are IDs that the virtual servers migrated from the physical server selected in step 1105 to a different physical server.

Subsequently, the plan making program 132 repetitively implements processing from step 1115 to step 1117 while selecting the virtual server IDs acquired in this step one by one. If the virtual server ID has not been acquired, the plan making program 132 implements step 1118. In step 1114B, the plan making program 132 selects one of the virtual server IDs which have not yet been selected from the virtual server IDs acquired in this step, and implements processing step 1115. If all of the virtual server IDs have been selected, the plan making program 132 then implements step 1118.

In this example, the virtual server IDs of the virtual servers VM1 and VM2 are obtained. Those two virtual servers VM1 and VM2 are migrated from the physical server S1 to the physical server S2.

In step 1115, the plan making program 132 acquires the allowable downtime of the virtual server selected in step 1114 with reference to the virtual server management table 313 as in step 1107. Subsequently, the plan making program 132 extracts the record whose virtual server downtime is smaller than the virtual server allowable downtime with reference to the migration method management table 315 as in step 1107. If one or more records are extracted, the plan making program 132 selects the record smallest in the virtual server downtime, and acquires the method ID from the method ID column 900 as in step 1107.

Also, if the record could not be extracted, because there is no method of migrating the virtual server while satisfying the allowable downtime of the virtual server, the plan making program 132 implements step 1120, and outputs an error to complete the processing.

In step 1116, the plan making program 132 transmits a compatibility check request, the virtual server ID selected in step 1114, the physical server ID selected in step 1105, and the physical server simulation table 311 to the compatibility check program 134. As described above, the compatibility check program 134 checks the compatibility between the virtual server and the physical server when migrating the designated virtual server to the designated physical server, with reference to the contents of the physical server management table 310, and checks whether a problem occurs in the migration, or not. In step 1116, the compatibility check program 134 returns to the plan making program 132 whether the virtual server having the above virtual server ID can be migrated to the physical server having the physical server ID, or not, with reference to the physical server simulation table 311 instead of the physical server management table 310. In this situation, the designated physical server ID is a physical server ID selected in step 1105, which corresponds to the ID of the physical server that has operated before the designated virtual server is migrated in step 1109. That is, this step confirms whether the virtual server can be returned to the physical server that has originally operated, or not.

If the virtual server can be migrated, the plan making program 132 then implements step 1117.

If the virtual server cannot be migrated, the plan making program 132 returns to step 1115, and again implements step 1116 after having selected a different migration method. In this situation, in step 1115, if the migration method that satisfies the allowable downtime of the virtual server selected in step 1114 does not exist, the plan making program 132 implements step 1120, outputs an error, and completes the processing.

In this example, the plan making program 132 confirms whether the virtual servers VM1 and VM2 on the physical server S2 can be migrated to the physical server S1 on which the VM1 and VM2 have operated before, or not. In this situation, because the physical server S1 has been subjected to the configuration change in step 1110, the virtual server cannot always been migrated in the same migration method as that in step 1109, and there is a possibility that the migration fails. In this way, the management server 130 simulates the migration of the virtual server and the configuration change of the physical server whereby the virtual server can be migrated to the physical server whose configuration has been changed, or not, in advance.

In step 1117, the plan making program 132 transmits a request for simulating the virtual server migration, and an ID of the virtual server migration task stored in the task ID column 800 of the task simulation table 314 to the server simulation program 133 in step 1109. Also, as the input values of the virtual server migration task, the ID of the virtual server selected in step 1114 as the virtual server to be migrated, and the ID of the physical server designated as the destination physical server in step 1109 as the source physical server, and the ID of the physical server selected in step 1105 as the destination physical server, respectively. The subsequent processing is identical with that in step 1109.

In step 1114B, the plan making program 132 selects the virtual server ID that has not yet been subjected to the processing from the virtual server IDs extracted in step 111A, and again implements the processing subsequent to step 1115. In this situation, because the physical server simulation table 311 is updated in step 1117, the confirmation of whether the migration can be conducted, or not, in step 1116, is implemented in a state where the physical server simulation table 311 is updated, that is, a state where the migration of the virtual server is simulated.

In step 1118, the plan making program 132 inserts the records of the number equal to the number of times of implementing the simulation in step 1117 into the virtual server migration plan 316, and stores the values in the procedure column 1000, the task column 1002, and the execution contents column 1003 in order of implementing the simulation. In this situation, the start scheduled date column 1001 is kept blank. The details are identical with those in step 1111.

As an example, the migration plan when the virtual servers VM1 and VM2 on the physical server S2 are returned to the physical server S1 corresponds to the procedures 4 to 5 in FIG. 10.

In step 1105B, the plan making program 132 selects the physical server ID that has not yet been selected from the physical server IDs extracted in step 1105A, and again implements the processing after step 1106. In this situation, because the physical server simulation table 311 is updated in preprocessing, the destination determination processing after step 1106 is implemented in a state where the physical server simulation table 311 is updated, that is, a state where the configuration change of the physical server is simulated.

In step 1119, the plan making program 132 transmits a request for determining the execution date, and the virtual server migration plan 316 to the execution date determination program 136. The execution date determination program 136 determines date when the respective procedures of the virtual server migration plan 316 are executed, and stores the date in the start scheduled date column 1001 of the virtual server migration plan 316 which is kept blank. The detailed processing procedure in this situation will be described later with reference to FIG. 15.

In step 1120, the plan making program 132 outputs an error indicating that there is no method of migrating the virtual server while satisfying the allowable downtime of the virtual server, and completes this processing. The details of the error contents are identical with the contents described in step 1112.

With the above processing, the virtual server migration plan 316 can be made. Hereinafter, update processing of the physical server simulation table 311 in steps 1104, 1109, and 1110 will be described with reference to FIGS. 12, 13, and 14. Also, the execution date determining processing in step 1119 will be described with reference to FIG. 15.

Figure 12:
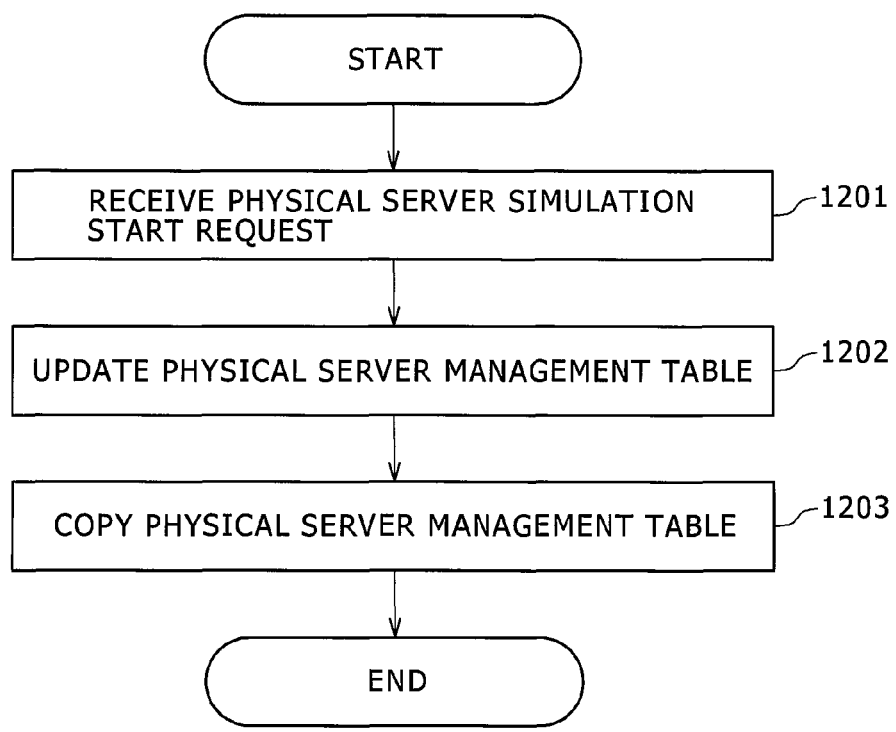
FIG. 12 is a flowchart illustrating an example of an operating procedure of starting a physical server simulation.

FIG. 12 is a flowchart illustrating an example of a processing procedure for starting the physical server simulation in step 1104.

In step 1201, the server simulation program 133 receives the physical server simulation start request transmitted by the plan making program 132. As a result, the processing of the physical server simulation starts.

In step 1202, the server simulation program 133 transmits a server information update request to the server information collection program 131. Upon receiving the server information update request, the server information collection program 131 connects to the first hypervisor 101 and the second hypervisor 111 over the network 120, and collects the configuration information and the load information on the first physical server 100 and the second physical server 110 on which the hypervisors 101 and 110 operate, and the virtual servers 102 and 103 that operate on the hypervisors 101 and 110. Subsequently, the server information collection program 131 stores the information on the collected physical servers 100 and 110 in the physical server management table 310, and stores the information on the collected virtual servers 102 and 103 in the virtual server management table 313. As a result, the server information collection program 131 updates the information on the physical servers 100, 110, and the virtual servers 102, 103 provided in the management server 130 to the updated information.

In step 1203, the server simulation program 133 copies the physical server management table 310, and creates the physical server simulation table 311. The configuration of the column of the created physical server simulation table 311, and the values stored in the record are identical with the configuration and the values of the physical server management table 310 updated in step 1202. As a result, the server simulation program 133 reproduces the state of the physical servers 100 and 110 at the time of implementing step 1202 within the management server 130. In the subsequent virtual server migration plan making processing, the server simulation program 133 updates the values stored in the physical server simulation table 311, and simulates the tasks such as the configuration change to be conducted on the physical servers 100 and 110, and the virtual server migration to be conducted on the virtual servers 102 and 103. With the use of the physical server simulation table 311, the server simulation program 133 can simulate without affecting the physical servers 100, 110, and the virtual servers 102, 103 in operation. Even while the virtual server migration plan making processing is being implemented, the server information collection program 131 collects the information on the physical servers 100, 110, and the virtual servers 102, 103, and continues to update the values stored in the physical server management table 310 and the virtual server management table 313. However, the values stored in the physical server simulation table 311 are not updated.

The server simulation program 133 finally transmits the completion of processing to the plan making program 132, and completes this processing.

Figure 13:
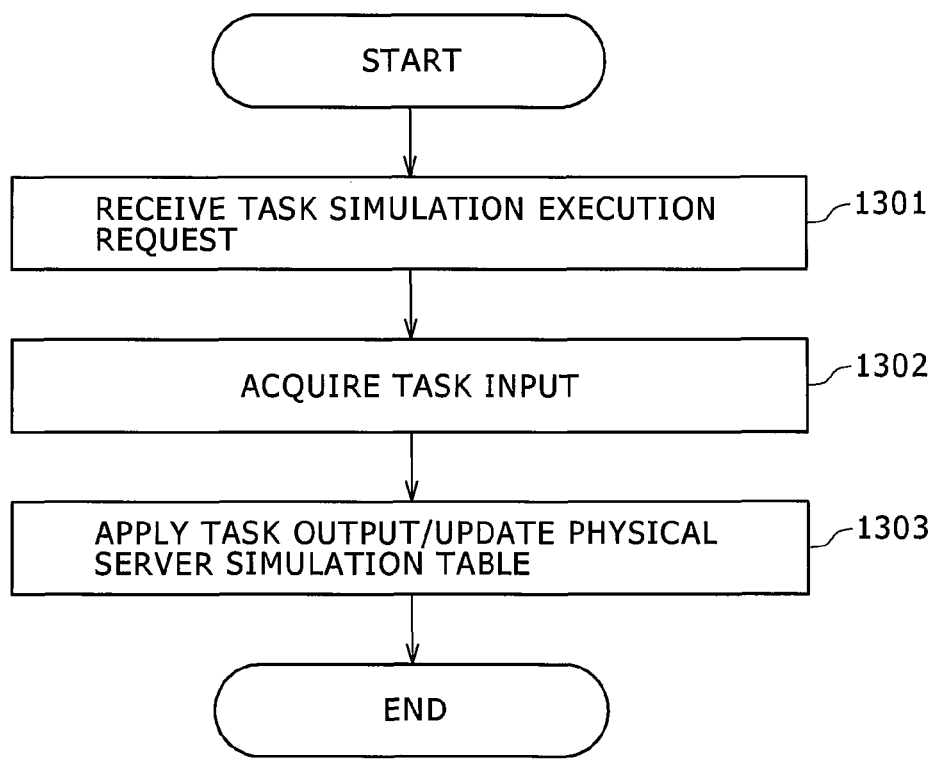
FIG. 13 is a flowchart illustrating an example of an operating procedure of executing a virtual server migration simulation.

FIG. 13 is a flowchart illustrating an example of a processing procedure of executing the simulation of migration of the virtual server in step 1109. In this case, processing of migrating the virtual server VM1 on the physical server S1 to the physical server S2 will be described as an example.

In step 1301, the server simulation program 133 receives a request for executing the task simulation, and the ID of the virtual server migration task from the plan making program 132. Also, the server simulation program 133 receives the ID of the virtual server to be migrated, the ID of the source physical server, and the ID of the destination physical server as input values of the task.

In this example, the server simulation program 133 receives T1 as the ID of the virtual server migration task, and VM1, S1, and S2 as the input value of the task.

In step 1302, the server simulation program 133 searches the task ID column 800 with reference to the task simulation table 314, and acquires the record in which the value matching the task ID received in step 1301 is stored. Subsequently, the server simulation program 133 acquires the value stored in the cell of the task input column 802 of the acquired record, and assigns the input value received by the plan making program 132 in step 1301 to the acquired value.

In this example, as illustrated in FIG. 8, the server simulation program 133 acquires the migration target server ID, the source physical server ID, and the destination physical server ID as the task input values, and assigns VM1, S1, and S2 received in step 1301 to the respective acquired IDs.

In step 1303, the server simulation program 133 acquires a calculation expression stored in the cell of the task output column 803 of the acquired record, and replaces a character string of the task input described in the calculation expression with the value assigned in step 1302. Sequentially, the server simulation program 133 searches the physical server simulation table 311 with the use of the calculation expression, and specifies the cell in which the value is changed. After the cell has been specified, the server simulation program 133 updates the value of the cell specified with the use of the calculation expression. When a plurality of calculation expressions is stored in the cell of the task output column 803 of the acquired record, the server simulation program 133 applies the respective calculation expressions to the physical server simulation table 311 in order.

In this example, the calculation expressions written in FIG. 8 are replaced with Cell[Record: physical server ID=S1][Column: virtual server]−=VM1, and Cell[Record: physical server ID=S2][Column: virtual server]+=VM1. With the use of the first calculation expression, the virtual server ID column 512 of the record in which the physical server ID 500 is S1 in the physical server simulation table 311 is a cell in which the value is updated, and the deletion of VM1 which is the ID of virtual server to be migrated from physical server S1 is the update contents of the value. In the second calculation expression, VM1 is added to the virtual server ID column 512 of the record in which the physical server ID 500 is S2.

With the above processing, the server simulation program 133 simulates the virtual server migration within the management server 130. The server simulation program 133 finally transmits the completion of processing to the plan making program 132, and completes this processing.

Figure 14:
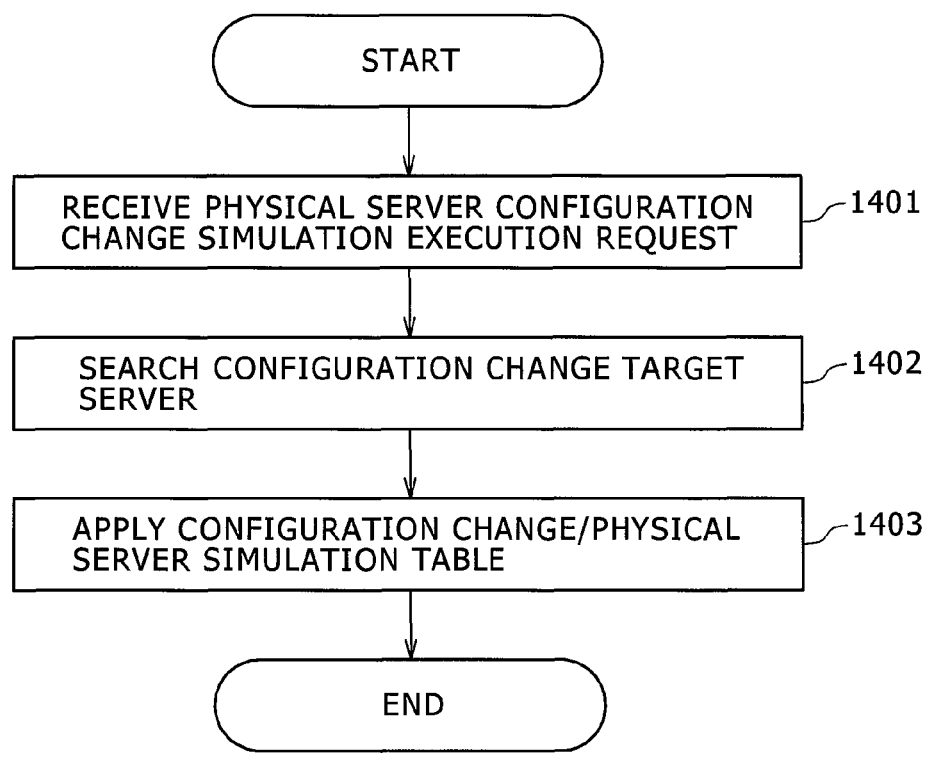
FIG. 14 is a flowchart illustrating an example of an operating procedure of executing a physical server configuration change simulation.

FIG. 14 is a flowchart illustrating an example of a processing procedure of executing the simulation of the configuration change of the physical server in step 1110. The operation of updating the version of the hypervisor from HV1 to HV2 will be described as an example.

In step 1401, the server simulation program 133 receives a request for simulating the physical server configuration change, and the ID of the configuration change of the configuration change management table 312 from the plan making program 132. Sequentially, the server simulation program 133 searches the configuration change ID column 600 with reference to the configuration change management table 312, and acquires the record in which the value matching the received configuration change ID is stored.

In this example, the server simulation program 133 receives C1 as the ID of the configuration change for updating the version of the hypervisor. Also, the server simulation program 133 searches the configuration change management table 312 in FIG. 6, and acquires the record in which the configuration change ID column 600 is C1.

In step 1402, the server simulation program 133 acquires the search condition stored in the cell with reference to the target server search condition column 601 of the record in the configuration change management table 312 acquired in step 1401. Subsequently, the server simulation program 133 searches the physical server simulation table 311 by using the search condition, and acquires all of the records that satisfy the search condition.

In this example, the server simulation program 133 acquires Cell[Column=hypervisor]==HV1 illustrated in FIG. 6 as the search condition. This search condition acquires the record in which the value stored in the cell of the hypervisor column 511 is HV1. When the server simulation program 133 searches the physical server simulation table 311 in FIG. 5 by using the search condition, the record in which the physical server ID 500 is S1 as the record satisfying the search condition is obtained.

In step 1403, the server simulation program 133 acquires the calculation expression stored in the cell with reference to the configuration change contents column 604 of the record in the configuration change management table 312 acquired in step 1401. Subsequently, the server simulation program 133 updates the value of the cell within the record of the physical server simulation table 311 acquired in step 1402, by using the acquired calculation expression. If a plurality of the calculation expressions is provided, the server simulation program 133 applies the respective calculation expressions to the record in order.

In this example, the server simulation program 133 obtains Cell[Column=hypervisor]=HV2 illustrated in FIG. 6 as the calculation expression. This calculation expression means that the value of HV2 is applied to the cell of the hypervisor column. When the server simulation program 133 updates the record of the physical server simulation table 311 acquired in step 1402 by using the calculation expression, the value of the cell in the hypervisor column 511 of the record in which the physical server ID 500 is S1 is updated from HV1 to HV2.

With the above processing, the server simulation program 133 simulates the physical server configuration change within the management server 130. The server simulation program 133 finally transmits the completion of processing to the plan making program 132, and completes this processing.

FIG. 15 is a flowchart illustrating an example of a processing procedure of determining the execution date of the virtual server migration plan 316 in step 1119.

In step 1501, the execution date determination program 136 receives a request for determining the execution date, and the virtual server migration plan 316 from the plan making program 132.

In step 1502, the execution date determination program 136 acquires the ID stored in the task column 1002 for the respective records of the received virtual server migration plan 316. Sequentially, the execution date determination program 136 searches the configuration change ID column 600 of the configuration change management table 312 or the task ID column 800 of the task simulation table 314 on the basis of the acquired ID, and acquires the record in which the value stored in the cell matches the above acquired ID.

If the acquired record is the record of the configuration change management table 312, the execution date determination program 136 acquires a required time stored in the cell with reference to the required time column 603.

Also, if the acquired record is the record of the task simulation table 314, the execution date determination program 136 acquires the task information ID stored in the cell with reference to the task information ID column 801. Sequentially, the execution date determination program 136 searches the migration method ID column 900 of the migration method management table 315, and acquires the required time stored in the cell with reference to a required time column 902 of the record having the value matching the acquired task information ID.

Sequentially, the execution date determination program 136 adds the required times acquired in the respective records, and calculates the overall required time necessary to implement all of the migration plan described in the virtual server migration plan 316.

In step 1503, the execution date determination program 136 extracts all of the IDs of the physical servers from the IDs stored in the cell with reference to the execution contents column 1003, for the respective records of the virtual server migration plan 316 received in step 1501. As a result, the execution date determination program 136 specifies all of the physical servers related to the virtual server migration plan 316.

In the example of FIG. 9, the IDs of the physical servers are two of S1 and S2 among the IDs stored in the execution contents column 1003. In FIG. 9, the physical servers S1 and S2 are related to the virtual server migration plan 316.

In step 1504, the execution date determination program 136 searches the physical server ID column 500 of the physical server simulation table 311, and acquires the record in which the value stored in the cell matches the physical server ID extracted in step 1503. Subsequently, the execution date determination program 136 acquires the values stored in a date column 521, the CPU load column 522, and the memory load column 523, which are sub-columns provided in the physical server load information column 520 of the acquired record. Also, the execution date determination program 136 acquires the values stored in the number of CPUs 513 and the amount of memory 514, which are sub-columns provided in the physical server configuration information column 510 of the acquired record. The above processing is implemented on the respective physical server IDs extracted in step 1503.

Subsequently, the execution date determination program 136 adds the CPU load 522 of each acquired physical server IDs at each date 521, and calculates a load of the overall physical server related to the virtual server migration plan 316 at each date 521. Also, the execution date determination program 136 adds the memory load 523 as with CPU load 522. In this situation, the execution date determination program 136 adds the values of the number of CPUs 513 and the amount of memory 514 provided in the respective physical servers extracted in step 1503 to calculate the amount of resources in the overall physical server related to the virtual server migration plan 316, divides the number of CPUs 513 and the amount of memory 514 of the individual physical servers by the calculated amount of overall resource, and calculates a rate of the resource of the individual physical servers. The execution date determination program 136 corrects the values of the CPU load 522 and the memory load 523 of the respective physical servers by using the calculated value of the resource rate, and adds the corrected values to calculate the load of the overall physical server related to the virtual server migration plan 316.

In the example of the physical servers S1 and S2 extracted from FIG. 9, the number of CPUs 513 and the amount of memory 514 are acquired from the physical server simulation table 311 in FIG. 5 to calculate the overall resource amount and the resource rate of the individual physical servers. In the number of CPUs 513, because the number of physical servers S1 is 8, and the number of physical servers S2 is 8, the overall amount of resources is 16. The resource rate of the physical server S1 is 50%, and the resource rate of the physical server S2 is 50%. Likewise, in the amount of memory 514, the overall amount of resources is 48 GB, and the resource rates of the physical servers S1 and S2 are 67% and 33%, respectively. When the overall load is calculated on the basis of the calculated resource rate, the CPU loads 522 of the physical servers S1 and S2 at 2010/7/1 00:00 are 80% and 40%, respectively. When the respective loads are added together after that the loads have been corrected at 50% and 50% which are the respective resource rates, the overall load becomes 60% in which 40% and 20% are added together. Likewise, in the memory load 523, as a result that 100% and 20% which are the memory loads 523 of the physical servers S1 and S2 are corrected at 67% and 33% which are the respective resource rates, and added together, the overall load becomes 73.6%. The same calculation is implemented at each date 521.

In step 1505, the execution date determination program 136 searches a time zone lowest in the load of the physical server with reference to the overall load information of the physical server related to the virtual server migration plan 316 calculated in step 1504 at each date 521. Specifically, the execution date determination program 136 acquires the overall load information in a specific period, for example, for past one day, from the overall load information.

Subsequently, the execution date determination program 136 collects the overall load information in the specific period for each specific time zone, for example, every one hour, and calculates an average of the overall load at each time zone. Subsequently, the execution date determination program 136 selects the time zone lowest in the overall load from the overall load in each calculated time zone.

In this situation, information used to select the time zone small in the overall load is not limited to the physical server load information 520, but may be the virtual server load information 720. Also, the load is not limited to the CPU load 522 or the memory load 523, but may be a load related to a network I/O or a disk I/O.

Also, a period for acquiring the overall load is not limited to, past one day, but for example, the overall load information for past one week or past one year may be acquired, and the time zone small in the overall load may be selected. In this situation, the time zone is not limited to the past one day, but the time zone may be selected taking a day within the past one week or a month within past one year into account.

In step 1506, the execution date determination program 136 sets a starting time of the time zone selected in step 1505 as a starting time in the procedure 1 of the virtual server migration plan 316, and stores the starting time in the start scheduled date column 1001 of the virtual server migration plan 316. Hereinafter, as a starting time subsequent to the procedure 2, the required time of the configuration change contents in the previous procedure is added to the starting time of the previous procedure, and stored in the start scheduled date column 1001. As the required time, the value acquired in step 1502 is applied.

Through the above processing, the execution date determination program 136 determines the start scheduled date of the respective procedures in the virtual server migration plan 316 within the management server 130. The execution date determination program 136 finally transmits the completion of processing to the plan making program 132, and completes this processing.

The processing of this embodiment has been described above in detail. Through this processing, the migration of the virtual server and the configuration change of the physical server are simulated with the use of the physical server simulation table 311 within the management server 130, the compatibility of the virtual server operation is checked in advance, without changing the system in operation, and the virtual server migration plan 316 can be automatically made.

What is claimed is:

1. A virtual server migration plan making method in a server system including a plurality of physical servers, virtual servers that operates on the physical servers, and a management server connected to the plurality of physical servers,
   each of the physical servers including a hypervisor that operates the virtual servers on the physical server, and
   the management server including:
   a physical server management table that manages configuration information on the physical servers and load information on the physical servers for each of the physical servers;
   a physical server simulation table obtained by copying the physical server management table;
   a virtual server management table that manages configuration information on the virtual servers, load information on the virtual servers, and an allowable downtime of the virtual servers, for each of the virtual servers;
   a task simulation table that manages change contents for the physical server simulation table in order to simulate a task of the virtual server migration; and
   a migration method management table that manages the downtime of the virtual servers for each migration method of the virtual servers,
   the virtual server migration plan making method comprising:
   upon receiving a request for making a virtual server migration plan associated with the configuration change of the physical server, the management server
   specifying a virtual server that operates on any physical server to be subjected to the configuration change;
   acquiring the allowable downtime of the specified virtual server with reference to the virtual server management table;

extracting the migration method of the virtual server having a downtime shorter than the allowable downtime of the acquired virtual server with reference to the migration method management table;

specifying a destination physical server to which the virtual server can be migrated with reference to the physical server management table or the physical server simulation table;

applying change content for simulating a task of the virtual server migration managed by the task simulation table to the physical server simulation table; and storing information on the virtual server to be migrated, the source physical server, the destination physical server, and the migration method of the extracted virtual server in the virtual server migration plan provided in the management server, as the change contents of the task of the simulated virtual server migration.

2. The virtual server migration plan making method according to claim 1, comprising:

the management server referring to the load information stored in the physical server simulation table;

selecting a time zone small in the load of the physical servers; and setting the time zone small in the selected load as an estimated start time of the virtual server migration plan.

3. The virtual server migration plan making method according to claim 1, wherein the management server includes a configuration change management table that manages configuration change contents describing a change to the information stored in the physical server simulation table in order to simulate a condition for searching a server to be subjected to the configuration change intended for the physical server, and the configuration update of the physical server.

4. The virtual server migration plan making method according to claim 3, comprising:

the management server applying the configuration change contents for simulating the configuration change of the physical servers managed by the configuration change management table to the physical server management table, and storing information on the server to be subjected to the configuration change and the operation of the configuration change contents in the virtual server migration plan as the configuration change contents of the simulated physical server.

5. The virtual server migration plan making method according to claim 4, wherein after storing the change contents of the task of the virtual server migration and the configuration change of the physical server into the virtual server migration plan, the management server determines whether the virtual server can be returned from the destination physical server to the source physical server, or not, with reference to the physical server migration table, if the virtual server can be returned, the management server applies the change contents for simulating the task of the virtual server return managed by the task simulation table to the physical server simulation table, and the management server further stores the information on the virtual server to be returned, the source physical server, the destination physical server, and the migration method of the extracted virtual server in the virtual server migration plan.

6. A computer system comprising:

a first physical server including a processor, a memory, a first hypervisor that manages a resource of a physical resource, and allocates the resource to a virtual resource, and a plurality of virtual servers that operates on the first hypervisor;

a second physical server including a processor, a memory, and a second hypervisor that manages the resource of the physical resource, and allocates the resource to the virtual resource; and a management server connected to the plurality of physical servers, wherein the management server includes:

a physical server management table that manages configuration information on the physical servers and load information on the physical servers for each of the physical servers;

a physical server simulation table obtained by copying the physical server management table;

a virtual server management table that manages configuration information on the virtual servers, load information on the virtual servers, and an allowable downtime of the virtual servers, for each of the virtual servers;

a task simulation table that manages change contents for the physical server simulation table in order to simulate a task of the virtual server migration; and a migration method management table that manages the downtime of the virtual servers for each migration method of the virtual servers, and wherein, upon receiving a request for making a virtual server migration plan associated with the configuration change of the physical server, the management server specifies a virtual server that operates on any physical server to be subjected to the configuration change, acquires the allowable downtime of the specified virtual server with reference to the virtual server management table, extracts the migration method of the virtual server having a downtime shorter than the allowable downtime of the acquired virtual server with reference to the migration method management table, specifies a destination physical server to which the virtual server can be migrated with reference to the physical server management table or the physical server simulation table, applies change content for simulating a task of the virtual server migration managed by the task simulation table to the physical server simulation table, and stores information on the virtual server to be migrated, the source physical server, the destination physical server, and the migration method of the extracted virtual server in the virtual server migration plan provided in the management server, as the change contents of the task of the simulated virtual server migration.

* * * * *